United States Patent [19]

Alldredge

[11] Patent Number: 5,149,113
[45] Date of Patent: Sep. 22, 1992

[54] CONVERTIBLE STROLLER AND CAR SEAT

[76] Inventor: Rodney H. Alldredge, 2013 Reed Rd., Birmingham, Ala. 35215

[21] Appl. No.: 680,752

[22] Filed: Apr. 5, 1991

[51] Int. Cl.$^5$ .............................................. B62B 7/12
[52] U.S. Cl. ..................... 280/30; 280/643; 280/47.4; 297/130
[58] Field of Search .............. 108/126, 130; 297/130; 280/30, 641, 642, 643, 648, 43.17, 43.22, 47.38, 47.4, 47.371

[56] References Cited

U.S. PATENT DOCUMENTS

| | | | |
|---|---|---|---|
| 1,240,964 | 9/1917 | Frank | 108/126 |
| 1,909,905 | 5/1933 | Simmons | 108/126 |
| 2,042,326 | 5/1936 | Weed | 108/130 |
| 2,533,173 | 12/1950 | Mitchell | 108/130 |
| 3,290,050 | 12/1966 | Ezquerra | 280/30 |
| 3,363,725 | 1/1968 | Lorrance | 108/130 X |
| 4,685,688 | 8/1987 | Edwards | 280/30 |
| 4,832,354 | 5/1989 | LaFreniere | 280/30 |
| 4,852,894 | 8/1989 | Dyer | 280/30 |
| 4,872,693 | 10/1989 | Kennel | 280/30 |
| 4,874,182 | 10/1989 | Clark | 280/30 |
| 4,878,680 | 11/1989 | Molnar | 280/30 |
| 4,896,894 | 1/1990 | Singletary | 280/30 |
| 4,902,026 | 2/1990 | Maldanado | 280/30 |

FOREIGN PATENT DOCUMENTS

480222  2/1938  United Kingdom ............... 108/126

*Primary Examiner*—Andres Kashnikow
*Assistant Examiner*—Michael Mar
*Attorney, Agent, or Firm*—Nies, Kurz, Bergert & Tamburro

[57] ABSTRACT

A convertible stroller and car seat including a housing positioned below a seat portion for receiving a pair of front wheels and a pair of rear wheels in retracted condition. An operating handle extends outwardly through the rear wall of the housing and is connected to a rotatable actuator disk from which connecting rods extend to respective wheel assemblies supporting the wheels. Movement of the handle from side to side causes the actuating disk to rotate, thereby either extending the wheels from the wheel housing or retracting the wheels into the wheel housing. One pair of diagonally opposed wheel carriers is adapted to pivot directly into and out of the wheel housing, and the remaining pair of diagonally opposed wheel carriers pivots into and out of the wheel housing and also rotate by 90° so that the four wheels when fully extended each lie in parallel planes for ease of use of the stroller. The stroller also includes a retractable handle that is in an extended position when used as a stroller and that is in a retracted position when the device is used as a car seat. The wheel housing includes a lower wall that has openings to receive the wheels, and serves to prevent contact of any of the wheel structure with vehicle upholstery when the device is used as a car seat.

20 Claims, 4 Drawing Sheets

CONVERTIBLE STROLLER AND CAR SEAT

BACKGROUND OF THE INVENTION

1. Field of the Invention

The present invention relates to a child's car seat that can be easily converted to a stroller and back to a car seat, as desired. More particularly, the present invention relates to a convertible stroller and car seat that provides a simple and effective mechanism for easily and rapidly extending a set of stroller wheels from a wheel housing beneath the seat, and permitting easy retraction of the wheels so that they are out of view and safely retracted when the device is used as a car seat.

2. Description of the Related Art

Convertible strollers and car seats have been proposed in the past, but each of the known structures has limitations or deficiencies that render it undesirable. For example, a convertible stroller and car seat is disclosed in U.S. Pat. No. 4,852,894, which issued Aug. 1, 1989, to Gloria Dyer. In the Dyer device the wheels are tiltable in a vertical plane from an extended position to a retracted position, and vice versa. However, the wheels remain exposed alongside the seat arms, and, further, the structure is such that the wheels must be swung up and down individually, which renders conversion of the device from one mode of operation to the other awkward and cumbersome.

An improved form of operating mechanism for converting a car seat to a stroller and back again is shown in U.S. Pat. No. 4,872,693, which issued Oct. 10, 1989, to Gordon Kennel. The Kennel structure includes a wheel frame that is defined by a plurality of interconnected links. The wheels and wheel frame links can be retracted into housings defined by the widths of the seat arms on either side of the seat. However, retraction and extension of the wheels is accomplished by a wheel operating handle that extends outwardly from one of the seat arms, and thus the operating handle can be subject to unintended manipulation by the child.

Another arrangement for providing a stroller that can be converted to and from a car seat is disclosed in U.S. Pat. No. 4,874,182, which issued Oct. 17, 1989, to Gary E. Clark. The Clark structure provides a shell housing below the seat, into which and from which the wheels can be retracted and extended by an operating handle that is positioned on a side of the shell housing. However, the Clark structure includes a large number of shafts, levers, and inner frame members, all of which contribute to the weight of the device and thereby render it undesirable.

Finally, still another form of convertible stroller and car seat is disclosed in U.S. Pat. No. 4,878,680, which issued Nov. 7, 1989, to Terrence O. Molnar. The Molnar structure involves a rectangular wheel carrier assembly that is maintained in a horizontal orientation and that can be moved up and down within a space defined by a perimeter frame that is positioned downwardly below a seat flange and that extends outward beyond the plane of the seat flange. The Molnar structure involves excessive weight, and the perimeter frame that extends outwardly beyond the seat on all sides occupies excessive space when the device is used as a car seat.

It is an object of the present invention to provide an improved stroller and car seat combination that avoids the deficiencies of the prior art structures.

It is another object of the present invention to provide a convertible stroller and car seat that is simple and compact in construction, with relatively few parts, and that has a light weight.

A still further object of the present invention is to provide a convertible stroller and car seat in which all of the stroller wheels are shiftable simultaneously and are completely retracted within the seat portion so that they are not visible, and s that the wheels cannot interfere with or tear the upholstery of a vehicle when used as a car seat.

It is still another object of the present invention to provide a convertible stroller and car seat that is operable by a single operating handle that is not easily accessible to a child seated in the seat.

It is a still further object of the present invention to provide a convertible stroller and car seat that is easy to use, that has a high mechanical advantage arrangement for conveniently operating the wheels so that a minimum of force is required to operate the device.

SUMMARY OF THE INVENTION

Briefly stated, in accordance with one aspect of the present invention, a convertible stroller and car seat is provided that includes a child seat having a seat portion and a back portion to comfortably accommodate a small child. A wheel housing is positioned below and is secured to the seat and a plurality of wheels are provided, each of the wheels being pivotable into and out of operating position for use of the device as a stroller, the wheel housing having a bottom wall that includes openings adjacent each wheel to permit the wheels to pass therethrough during an extension or retraction operation yet provide a substantially planar lower housing wall so that neither the wheels nor the wheel operating mechanism is in contact with the vehicle upholstery.

A pivotable wheel carrier is positioned within the wheel housing and includes an operating handle that extends in a rearward direction relative to the child seat, to render operation of the device by a child sitting in the seat practically impossible. The operating handle is connected with a rotatable actuator that is adapted to rotate in a plane substantially parallel to the plane of the seat, and individual connecting rods extend from the actuator to the respective wheel carriers for permitting pivotal movement of the wheel carriers between extended and retracted positions in response to pivotal movement of the rotatable actuator and attached operating handle.

DESCRIPTION OF THE PREFERRED EMBODIMENTS

Figure 1:
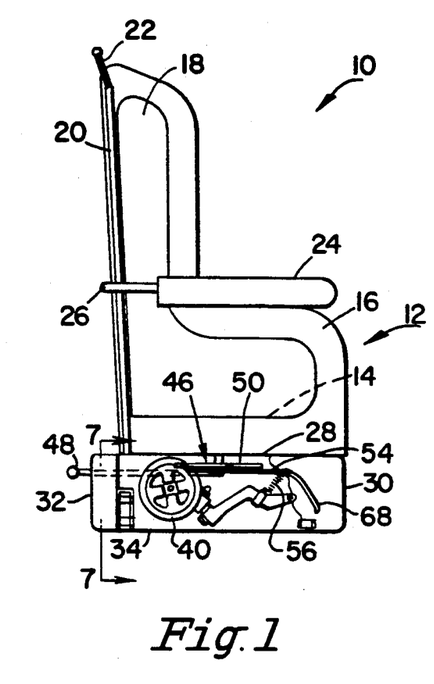
FIG. 1 is a side elevational view showing a convertible stroller and car seat in accordance with the present invention when in the car seat mode with the stroller wheels retracted into the wheel housing.
Figure 2:
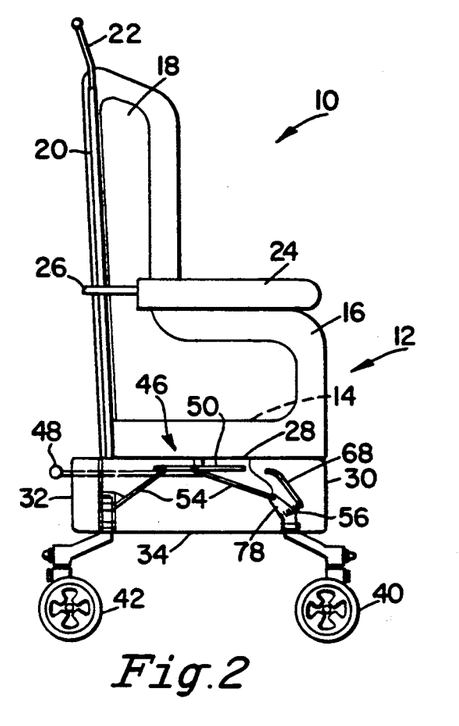
FIG. 2 is a side elevational view similar to that of FIG. 1, except that the stroller wheels have been extended from the wheel housing and are in position to permit the device to be used as a stroller.

Referring now to the drawings, and particularly to FIGS. 1 and 2 thereof, there is shown a convertible stroller and car seat 10 in accordance with the present invention. The device includes a seat portion 12 having a seat 14, a pair of arms 16 (only one of which is visible in FIGS. 1 and 2), and a back portion 18. Extending along the rear side 20 of back portion 18 is a stroller handle 22 of telescoping structure so that the handle can be selectively extended and retracted relative to seat portion 12.

As will be appreciated by those skilled in the art, handle 22 can either be a U-shaped handle including a horizontal cross bar between two vertical bars, or it can be two individual, J-shaped rods that are slidably received in respective tubular supports carried adjacent rear side 20 of back portion 18.

The telescoping handle can be retained in either an extended or a retracted position by means of a retainer structure (not shown). In that regard, one form of retainer structure that is suitable is a spring loaded detent carried by one part of the telescoping handle, the detent being releasably received in a recess or opening formed in the other part of the telescoping handle, as will also be appreciated by those having skill in the art.

Preferably, a padded safety bar 24 having a generally U-shape can be provided at the approximate level of the tops of the seat arms 16 to extend around the front and sides of the seat to thereby prevent a child from inadvertently falling out of the seat. Safety bar 24 is preferably arranged to be pivotable about a horizontal pivot axis 26 adjacent rear face 20 of seat portion 12 as shown. Alternatively, however, instead of the padded safety bar 24 shown, a suitable safety belt (not shown) could also be provided to extend across seat portion 12, either instead of safety bar 24 or in addition to it, as desired.

Figure 3:
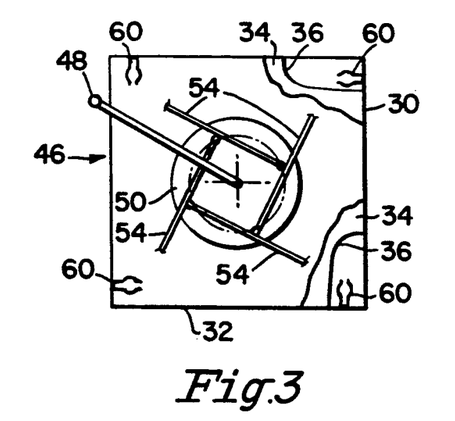
FIG. 3 is a bottom view of the device shown in FIG. 1, showing the position of the operating lever and wheel operating mechanism when the wheels are in the retracted position.

Seat portion 12 of the device has disposed on its lower surface 28 a generally rectangular wheel housing 30 defined by a circumferential skirt 32 that extends downwardly from the periphery of seat lower surface 28 and that terminates in a flat housing lower wall 34. As best seen in FIG. 3, lower wall 34 is continuous over the lower edge of skirt 32 defining the periphery of wheel housing 30, except for wheel openings 36 at each lower corner of wheel housing 30 to permit extension and retraction of each of the four stroller wheels into and out of the interior of housing 30. As shown, the convertible stroller/car seat structure includes a left front wheel 38, a right front wheel 40, a right rear wheel 42, and a left front wheel 44.

Figure 4:
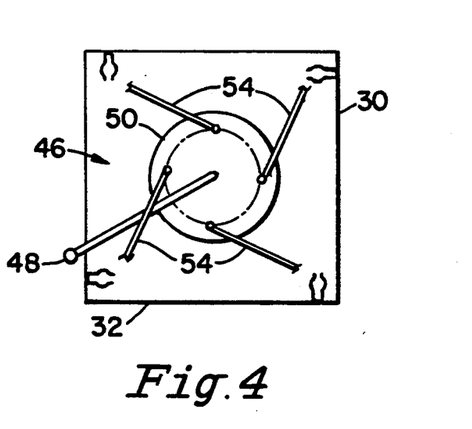
FIG. 4 is a view similar to FIG. 3, except that the parts are in the position corresponding to that when the stroller wheels are fully extended as shown in FIG. 2.

Wheel housing 30 contains an operating mechanism 46 for extending and retracting the wheels, the operating mechanism being shown more clearly in FIGS. 3 and 4, which are bottom views of wheel housing 30 without the wheels and with lower wall 34 partially broken away for clarity. As shown, operating mechanism 46 includes an elongated wheel operating lever 48 that extends rearwardly through a generally horizontally disposed elongated slot in the rearward facing portion of skirt 32 to permit operating lever 48 to move between the two extreme positions shown in FIGS. 3 and 4.

Operating lever 48 extends radially from and is secured to an actuating disk 50 that is pivotally supported within housing 30 for pivotal movement about a vertical pivot axis 52 by suitable structure of a type and in a manner that will be readily apparent to those skilled in the art. Actuating disk 50 lies in a substantially horizontal plane below seat lower surface 28.

Pivotally connected with actuating disk 50 are four individual connecting rods 5 that each extend from the lower surface of actuating disk 50 to a respective one of wheel assemblies 38, 40, 42, and 44. Preferably, connecting rods 54 are of equal length, and each is connected with actuating disk 50 at a predetermined radial distance from pivot axis 52 and inwardly of the outer periphery of actuating disk 50. Further, the points at which the respective connecting rods are connected with actuating disk 50 are preferably equidistantly spaced in a circular direction. The positions of the parts as shown in FIG. 3 corresponds with the wheels in a retracted condition within housing 30, as shown in FIG. 1, to permit use of the device as a car seat, while the positions of the parts as shown in FIG. 4 corresponds with the wheels in an extended position, as shown in FIG. 2, to permit use of the device as a stroller.

Figure 6:
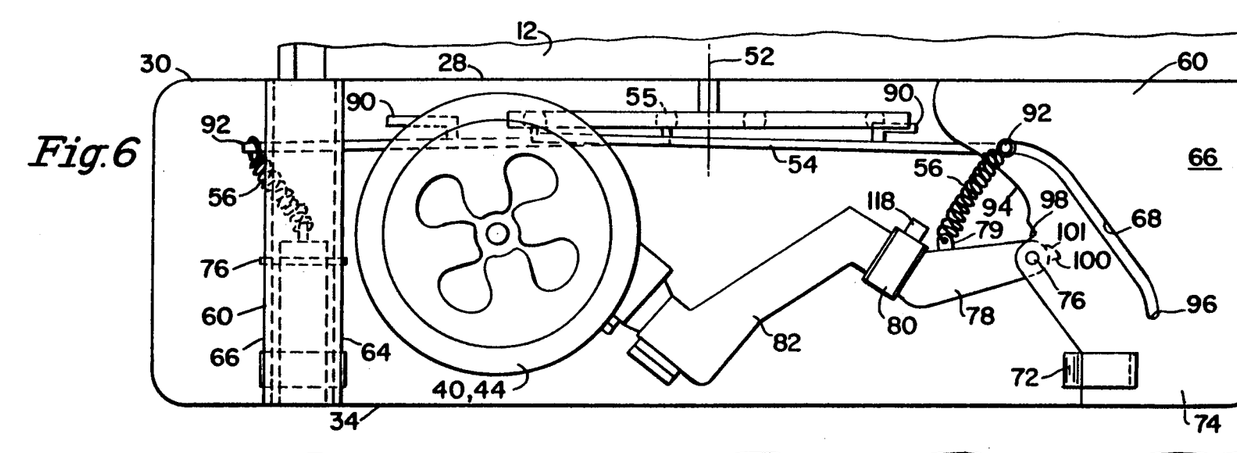
FIG. 6 is an enlarged, fragmentary, side cross-sectional view of the wheel housing as shown in FIG. 1 with the wheels in the retracted position.
Figure 7:
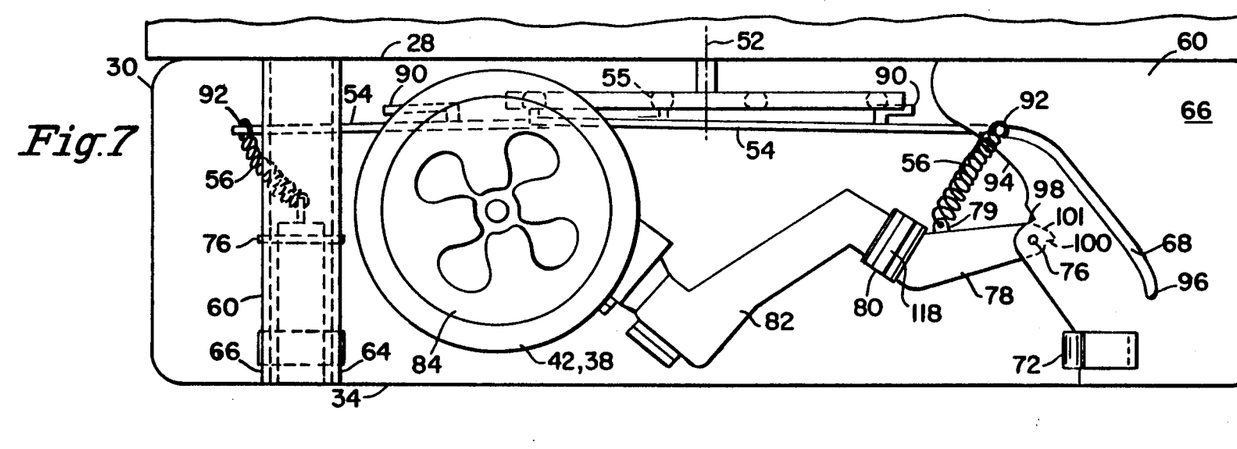
FIG. 7 is an enlarged, fragmentary cross-sectional view through the wheel housing taken along the line 7—7 of FIG. 1.
Figure 8:
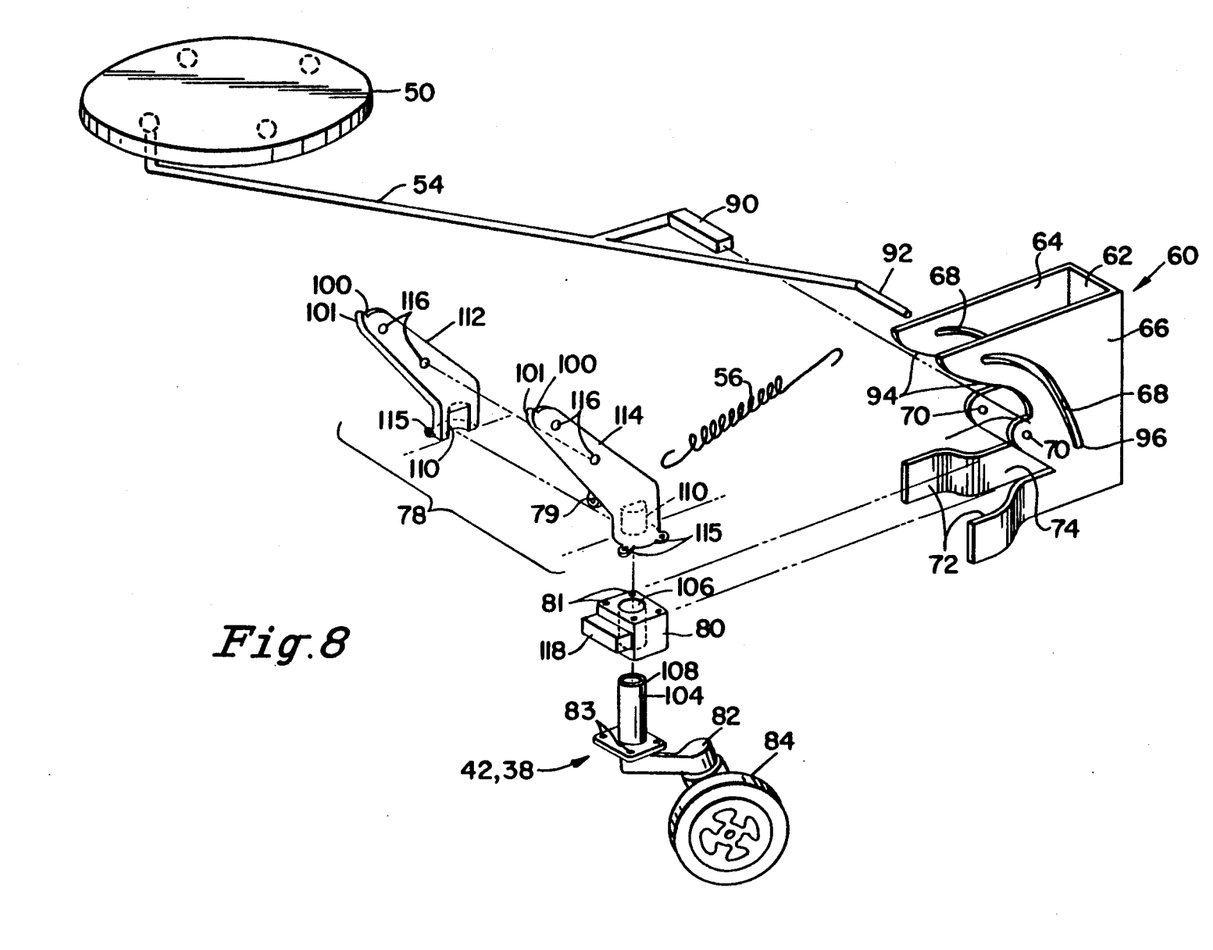
FIG. 8 is a fragmentary, exploded view showing several of the parts of the wheel operating mechanism for one of the two wheels that undergoes pivotal movement as it is being extended or retracted.

As seen more clearly in FIGS. 6, 7, and 8, the outermost ends 92 of connecting rods 54 are connected with a respective wheel assembly through a coiled tension spring 56, which extends from a connecting tab 79 on pivot arm 78 of the associated wheel assembly to the outermost end 92 of the respective connecting rod 54. In that regard, FIG. 6 shows the operating mechanism associated with a wheel assembly that merely extends and retracts relative to housing 30, such as right front wheel assembly 40 and left rear wheel assembly 44, and FIG. 7 shows the operating mechanism associated with a wheel assembly that also pivots during the course of its extension and retraction relative to housing 30, such as right rear wheel assembly 42 and left front wheel assembly 38.

Wheel housing 30 includes four equally configured wheel pivot carriers 60, each of which is positioned adjacent a corner of wheel housing 30 (see, for example, FIG. 3). As best seen in FIG. 8, wheel pivot carriers 60 are generally U-shaped structures that include a rectangular back wall panel 62, from the respective longitudinal ends of which extend an inner plate 64 and an outer plate 66. Inner and outer plates 64 and 66 are parallel with each other and each includes a correspondingly shaped spring guide slot 68 and a pivot aperture 70. Spring guide slots 68 are generally arc-shaped, and pivot apertures 70 are on the concave side of the spring guide slot. Positioned below pivot apertures 70 are cam surfaces 72 that curve gradually outwardly in opposite directions, as shown, to define a generally U-shaped opening that is wider at the outer extremity of cam surfaces 72 and narrower inwardly thereof to define a cam follower retainer slot 74.

Referring once again to FIG. 6, pivot apertures 70 receive a pivot shaft 76 that pivotally supports a pivot arm 78 that can be swung about a substantially horizontal axis from the retracted position shown in FIGS. 1 and 6 to the extended position shown in FIG. 2. The free end of pivot arm 78 carries a cam follower block 80 that is secured to pivot arm 78 and to a generally L-shaped wheel carrier arm 82. A single or double stroller wheel 84 is rotatably supported at the outermost end of wheel carrier arm 82. The wheel assembly is maintained in the retracted position shown in FIG. 6 by tension coil spring 56 that extends from connecting tab 79 on pivot arm 78 to the outermost end 92 of connecting rod 54. End 92 extends laterally through the opposed spring guide slots 68, and its movement is guided by the slots.

Referring once again to FIG. 8, connecting rod 54 extends to actuating disk 50 and has its innermost end connected with disk 50 in such a way that rod 54 can both pivot about a vertical axis, relative to disk 50, as well as to pivot relative to a horizontal plane passing through disk 50. For that purpose, any suitable form of connection 55 between the innermost end of connecting rod 54 and actuating disk 50 can be employed, and in FIGS. 6, 7 and 8 a ball-joint-type connection is generally shown. However, as will be appreciated by those skilled in the art, other connection arrangements can also be provided.

Also carried by connecting rod 54, as shown in FIGS. 6, 7, and 8, is an elongated stop bar 90 that has its longitudinal axis substantially parallel with the axis of the outer end 92 of connecting rod 54, and is also substantially parallel with the pivot axis defined by pivot apertures 70. Stop bar 90 is adapted to pass adjacent the innermost edges 94 of inner and outer plates 64 and 66 so that when connecting rod outer end 92 is at the lower end 96 of spring guide slot 68, the stop bar 90 is positioned at a stop notch 98 immediately above pivot apertures 70. When in that position, stop bar 90 also engages an outwardly extending stop tab 100 carried by pivot arm 78 and thereby serves to hold the associated wheel assembly in its extended position and to prevent pivotal movement of the associated wheel assembly back into wheel housing 30.

As will be understood, two of the wheel assemblies are required to pivot as they extend and retract, in order that the four wheels lie in parallel planes when they are in the extended position to permit easy movement of the device when it is in the stroller mode. In the structural arrangement illustrated, right rear wheel assembly 42 and left front wheel assembly 38 must undergo the additional pivotal movement.

Referring now to FIGS. 7 and 8, the wheel assemblies 42 and 38, for the right rear and left front wheels, respectively, each include a cam follower block 80 that is non-rotatably secured to the respective wheel carrier arm 82, such as by bolts (not shown) that pass through bolt holes 81 in block 80 and through bolt holes 83 in carrier arm 82. Wheel carrier arm 82 includes a wheel carrier shaft 104 that passes through a bore 106 in cam follower block 80 and has its outer end 108 rotatably received in a pair of semi-cylindrical openings 110 formed in the split pivot arm halves 112, 114, as shown in FIG. 8. When pivot arm halves 112, 114 are connected together, such as by means of bolts or other connecting devices passing through connecting holes 116, they retain wheel carrier shaft 104 and restrain it from axial movement, but permit rotation so that wheel carrier arm 82 and cam follower block 80 are rotatable relative to connected pivot arm halves 112, 114.

Cam follower block 80 can be of generally rectangular form, as shown, and includes a laterally outwardly extending flange 118 that extends from one side surface of follower block 80. The follower block is adapted to be received in cam follower retainer slot 74 that is defined between the spaced inner and outer plates 64, 66 of wheel support bracket 60. Cam surfaces 72 on support bracket 60 cooperate with laterally extending flange 118 to rotate cam follower block 80 and wheel carrier arm 82 if follower 80 and carrier arm 82 are so oriented that flange 118 extends in a direction toward and is adjacent a cam surface 72. Thus, cam follower block 80 is adapted to be received in cam follower retainer slot 74 in only a single orientation, with flange 118 extending outwardly from retainer slot 74.

In wheel assemblies 40 and 44, for the right front and left rear wheels, respectively, the same parts are used as for the other two wheels that tilt during extension and retraction. However, and as best seen in FIG. 6, cam follower block 80 is oriented relative to pivot arm 78 so that flange 118 does not come into contact with either of cam surfaces 72, and therefore wheel carrier arm 82 does not pivot upon extension or retraction. In that regard, pivot arm 78, cam follower block 80, and wheel carrier arm 82 are all bolted together by bolts (not shown) that pass through bolt holes 115 in arm 78, through bolt holes 81 in block 80, and through bolt holes 83 in carrier arm 82.

In operation, with the stroller wheels in the retracted position as shown in FIG. 1, operating handle 48 is moved from right to left as one faces rear surface 20 of seat back 18. The leftward movement of the operating lever causes actuating disk 50 to pivot in a counter-clockwise direction, as viewed from the bottom of wheel housing 30 as shown in FIGS. 3 and 4, to cause the respective connecting rods 54 to each simultaneously move toward the respective corners of wheel housing 30 at which their associated wheel assemblies are carried. In the course of the outward movement of rods 54, rod outer ends 92 move outwardly and down along spring guide slots 68 in the respective support brackets 60, which causes tension springs 56 to each extend and to follow rod outer ends 92 in an outward and downward direction as viewed in FIGS. 6 and 7. When springs 56 pass over and downwardly relative to the corresponding pivot apertures 70 the spring force acting on the respective pivot arm tabs 79 causes pivot arms 78 to move in a counterclockwise direction, as viewed in FIGS. 6 and 7. As a result, pivot arm 78, cam follower block 80, wheel carrier arm 82, and the associated wheel are carried downwardly and outwardly through wheel openings 36 in wheel housing 30 so that flange 118 on ca follower block 80 contacts cam surface 72 in order to cause pivotal movement of cam follower block 80 so that it can be received within cam follower retainer slot 74.

At about the time a wheel assembly is in its fully extended position, stop bar 90 carried by connecting rod 54 has moved along innermost edges 94 of inner and outer plates 64, 66 to rest in stop notches 98 formed in each of those plates. When positioned in stop notches 98, stop bar 90 also engages stop tabs 100 on pivot arm 78, which serves to prevent clockwise movement of pivot arm 78 and the associated wheel assembly, as viewed in FIGS. 6 and 7, so that the wheel assembly is held in an extended position and cannot be inadvertently pushed back into wheel housing 30, such as might occur if the wheel strikes an obstruction. During its downward movement, stop bar 90 comes into contact with the curved portion 101 on pivot arm 78, and as arm 78 continues to pivot by virtue of the pivoting force applied to arm 78 by spring 56, stop bar 90 rides along curved portion 101 until it snaps into position between stop tabs 100 on arm 78 and stop notches 98 on wheel pivot carrier 60.

The wheel carrier movement as just described applies to the right front and left rear wheels, which merely move into and out of the wheel housing without any relative movement between the wheel carrier arm and the associated pivot arm. However, for the right rear and left front wheels, the wheel carrier arms must undergo a 90° rotation about the wheel carrier shafts in order properly to orient the wheels to permit the stroller to be conveniently pushed. In that regard, for those two wheels the cam follower is positioned relative to the pivot arm and wheel carrier arm as shown in FIG. 7, with the laterally extending lip facing outwardly toward the side of the wheel housing, rather than facing upwardly as shown in FIG. 6 for the remaining two wheels. Thus, as the wheel carrier of FIG. 7 moves downwardly upon movement of the operating lever from the wheel retracted to the wheel extended position, the pivotal movement of the pivot arm carries the cam follower into the space defined by the opposed cam surfaces carried by the inner and outer plates of the support brackets. Because the lip extends laterally, it contacts the cam surface which causes the cam follower to pivot so that the lip faces upwardly, thereby rotating the wheel carrier arm and the wheel by 90°, and simultaneously permitting the cam follower to pass into the cam follower retainer slot. The locking action obtained by the stop bar and its engagement with the stop notch and stop tabs is the same as for the other wheels shown in FIG. 6 which do not undergo the rotational movement as they are pivoted about the pivot axis.

when the wheels are in the extended position, as shown in FIG. 2, and the respective stop bars 90 are in position, the device can be used as a stroller to conveniently transport a child. When it is desired that the device be converted from a stroller to a child's car seat, the wheels are preferably retracted to avoid movement of the device when it is placed on the seat of a car. Conversion of the device to a car seat is effected by moving operating lever 54 from left to right, as viewed by on standing behind seat back portion 18 of the device. That movement of the operating lever reverses the movements that the parts undergo during the wheel extension operation. In that regard, the pivotal movement of actuating disk 50 takes place in a clockwise direction, as viewed in FIGS. 3 and 4, which causes connecting rods 54 to be drawn away from the corners of housing 30. Connecting rod ends 92 therefore move upwardly and inwardly from the lower ends 96 of the spring guide slots 68, which cause respective stop bars 90 to move away from stop notches 98 and also away from stop tabs 100. Further movement of the connecting rods 54 causes springs 56 to pass over the pivot apertures 70 and to draw pivot arms 78 and their associated wheel assemblies in a clockwise direction about pivot apertures 70 and upwardly into wheel housing 30 so that the wheels no longer extend through the respective wheel openings in the lower wall of the wheel housing and are fully retracted into the wheel housing.

Figure 5:
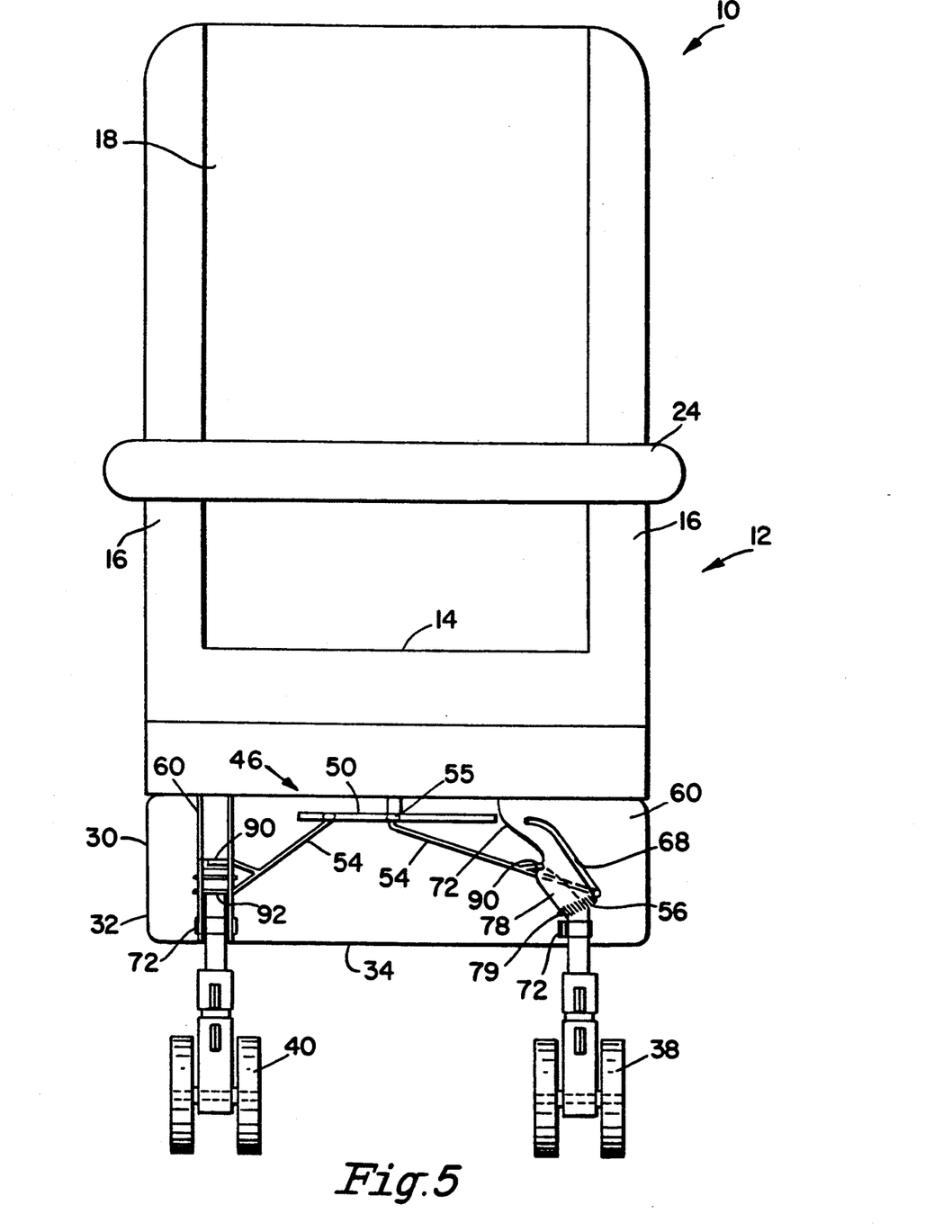
FIG. 5 is an enlarged front view of a convertible stroller and car seat in accordance with the present invention with the wheels fully extended in the stroller mode.

As best seen in FIG. 5, the stroller wheels are preferably of the dual wheel type, but single wheels can also be used, if desired.

It can thus be seen that the present invention provides an improved, easily operable, convertible stroller and car seat that is convenient to use and that operates in a positive manner. In that regard, the present invention is adapted to be operable with a child sitting in the seat. Extension of the wheels can be accomplished by rocking the device backwards while holding the stroller handle, to permit the front wheels to freely extend. Because of the springs 56 associated with each wheel carrier assembly and with each connecting rod 54, the weight acting on the rear wheels will maintain them in the retracted condition, and subsequently rocking the device forward on the extended front wheels will then permit the rear wheels to freely extend. For retraction, the reverse procedure can be followed.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. Combined stroller and child seat apparatus that is selectively convertible between a stroller mode in which the apparatus is adapted to be moved over the ground on stroller wheels extending from the apparatus, and a child seat mode in which the stroller wheels are retraced, said apparatus comprising:

a. a child seat including a seat portion and a back portion to accommodate a small child, and a wheel housing positioned below and secured to the seat portion for receiving a plurality of wheels to permit conversion of the device to and from a stroller;

b. a plurality of wheel carriers pivotally carried by the wheel housing for pivotal movement into and out of the housing, each wheel carrier rotatably supporting at least one wheel to permit the apparatus to be pushed along the ground when the wheels are extended from the wheel housing to place the apparatus in the stroller mode;

c. a pivotable wheel carrier actuator carried within the wheel housing for pivotal movement about a substantially vertical pivot axis to selectively move the wheel carriers between a retracted position within the wheel housing and an extended position at which each wheel carrier extends outwardly from the wheel housing;

d. connection means extending between the wheel carriers and the wheel carrier actuator for transferring pivotal movement of the wheel carrier actuator about a substantially vertical pivot axis to the wheel carriers to pivot the wheel carriers about substantially horizontal pivot axes between extended and retracted positions;

e. actuating means extending outwardly from the wheel housing, the actuating means connected with the wheel carrier actuator for pivoting the wheel carrier actuator; and f. a plurality of support brackets carried within the wheel housing for pivotally supporting the wheel carriers for movement about substantially horizontally disposed pivot axes, wherein the support brackets include guide slots for guiding movement of outer ends of the connecting rods in a downward and outward direction during wheel extension, and tension springs extending between the outer ends of the connecting rods and the wheel carriers for pivoting the wheel carriers about their pivot axes as the connecting rod ends move along the guide slots.

2. Convertible stroller and chile seat apparatus as claimed in claim 1 wherein the actuating means extends in a rearward direction relative to the child seat.

3. Convertible stroller and child seat apparatus as claimed in claim 1 including a retractable push handle carried by the child seat for movement between an extended position for pushing the apparatus when it is in the stroller mode, and a retracted position when the apparatus is in the child seat mode.

4. Convertible stroller and child seat apparatus as claimed in claim 1 wherein the wheel carrier actuator is a disk that includes a plurality of connectors for connecting the connecting rods to the wheel carrier actuator disk for movement of the connecting rods about both vertical and horizontal axes relative to the actuator disk.

5. Convertible stroller and child seat apparatus as claimed in claim 4 wherein the connectors are ball joints.

6. Convertible stroller and child seat apparatus as claimed in claim 4 wherein the disk is carried in the wheel housing and lies in a plane substantially parallel with the ground.

7. Convertible stroller and child seat apparatus as claimed in claim 1 including stop means carried by the wheel carrier for maintaining the wheels in an extended position until retracted, the stop means blocking retraction of the wheel carrier until the wheel carrier actuating means is pivotally moved to shift the respective wheel carriers from their extended positions toward their retracted positions.

8. Convertible stroller and child seat apparatus as claimed in claim 7 wherein the stop means include stop bars carried by the connecting rods and engagable with the support brackets and with the wheel carriers for maintaining the wheel carriers in an extended position.

9. Convertible stroller and child seat apparatus as claimed in claim 8 wherein the wheel carriers include stop tabs that are engagable with the stop bars for restraining the wheel carriers in an extended position.

10. Convertible stroller and child seat apparatus as claimed in claim 7 wherein the support brackets include camming surfaces and at least one pair of diagonally opposed wheel carriers each include a cam engagable with the camming surfaces to rotate the associated wheel through a angle of about 90° as the wheel carrier is moved between extended and retracted positions.

11. Convertible stroller and child seat apparatus as claimed in claim 7 wherein one pair of diagonally opposed wheel carriers includes a pivot arm pivotally carried by a support bracket for pivotal movement about a substantially horizontal pivot axis, and a carrier arm pivotally carried by the pivot arm for pivotal movement about a pivot axis that lies in a plane that is substantially perpendicular to the horizontal pivot axis.

12. A wheel housing for supporting a plurality of wheels that are extendable from and retractable into the housing, said housing adapted for use with a combined stroller and child seat apparatus that is selectively convertible between a stroller mode in which the apparatus is adapted to be moved over the ground on the wheels when extended from the housing, and a child seat mode in which the wheels are retracted into the housing, said housing comprising:

a. a wheel housing for supporting a plurality of extendable and retractable wheels;

b. a plurality of wheel carriers pivotally carried by the wheel housing for pivotal movement into and out of the housing, each wheel carrier rotatably supporting at least one wheel;

c. a pivotable wheel carrier actuator carried within the wheel housing for pivotal movement about a substantially vertical pivot axis to selectively move the wheel carriers between a retracted position within the wheel housing and an extended position at which each wheel carrier extends outwardly from the wheel housing;

d. connection means extending between the wheel carriers and the wheel carrier actuator for transferring pivotal movement of the wheel carrier actuator about a substantially vertical pivot axis to the wheel carriers to pivot the wheel carriers about substantially horizontal pivot axes between extended and retracted positions;

e. actuating means extending outwardly from the wheel housing, the actuating means connected with the wheel carrier actuator for pivoting the wheel carrier actuator; and f. a plurality of support brackets carried within the wheel housing for pivotally supporting the wheel carriers for movement about substantially horizontally disposed pivot axes, wherein the support brackets include guide slots for guiding movement of outer ends of the connecting rods in a downward and outward direction during wheel extension, and tension springs extending between the outer ends of the connecting rods and the wheel carriers for pivoting the wheel carriers about their pivot axes as the connecting rod ends move along the guide slots.

13. A wheel housing as claimed in claim 12 wherein the wheel carrier actuator is a disk that includes a plurality of connectors for connecting the connecting rods to the wheel carrier actuator disk for movement of the connecting rods about both vertical and horizontal axes relative to the actuator disk.

14. A wheel housing as claimed in claim 13 wherein the connectors are ball joints.

15. A wheel housing as claimed in claim 13 wherein the disk is carried in the wheel housing and lies in a plane substantially parallel with the ground.

16. A wheel housing as claimed in claim 12 including stop means carried by the wheel carriers for maintaining the wheels in an extended position until retracted, the stop means blocking retraction of the wheel carrier until the wheel carrier actuating means is pivotally moved to shift the respective wheel carriers from their extended positions toward their retracted positions.

17. A wheel housing as claimed in claim 12 wherein the stop means include stop bars carried by the connecting rods and engagable with the support brackets and with the wheel carriers for maintaining the wheel carriers in an extended position.

18. A wheel housing as claimed in claim 17 wherein the wheel carriers include stop tabs that are engagable with the stop bars for restraining the wheel carriers in an extended position.

19. A wheel housing as claimed in claim 12 wherein the support brackets include camming surfaces and at least one pair of diagonally opposed wheel carriers each include a cam engagable with the camming surfaces to rotate the associated wheel through an angle of about 90° as the wheel carrier is moved between extended and retracted positions.

20. A wheel housing as claimed in claim 12 wherein one pair of diagonally opposed wheel carriers includes a pivot arm pivotally carried by a support bracket for pivotal movement about a substantially horizontal pivot axis, and a carrier arm pivotally carried by the pivot arm for pivotal movement about a pivot axis that lies in a plane that is substantially perpendicular to the horizontal pivot axis.

* * * * *